United States Patent [19]
Taylor

[11] Patent Number: 6,113,087
[45] Date of Patent: Sep. 5, 2000

[54] WORK HOLDING APPARATUS

[75] Inventor: John Jeremy Taylor, Solihull, United Kingdom

[73] Assignee: Unova U.K. Limited, Aylesbury, United Kingdom

[21] Appl. No.: 09/308,107

[22] PCT Filed: Dec. 22, 1997

[86] PCT No.: PCT/GB97/03459

§ 371 Date: May 4, 1999

§ 102(e) Date: May 4, 1999

[87] PCT Pub. No.: WO98/32646

PCT Pub. Date: Jul. 30, 1998

[30] Foreign Application Priority Data

Jan. 25, 1997 [GB] United Kingdom .................. 9701574
Jul. 3, 1997 [GB] United Kingdom .................. 9713961

[51] Int. Cl.[7] ........................................... B23Q 3/08
[52] U.S. Cl. .................................... 269/32; 269/289 R
[58] Field of Search .............................. 269/32, 289 R, 269/901, 20, 27

[56] References Cited

U.S. PATENT DOCUMENTS 2,241,794 5/1941 Stull .......................................... 269/32

FOREIGN PATENT DOCUMENTS 0 711 701 5/1996 European Pat. Off. .
879 950 6/1953 Germany .
2 058 636 4/1981 United Kingdom .

*Primary Examiner*—David A. Scherbel
*Assistant Examiner*—Daniel G. Shanley
*Attorney, Agent, or Firm*—Lee, Mann, Smith, McWilliams, Sweeney & Ohlson

[57] ABSTRACT

A workpiece clamp comprising an upstanding pillar (30, 32) having two relatively movable workpiece engaging jaws (34, 36, 42, 44) extending from, and carried by the upper end of the pillar. A drive (74) for effecting the movement of the jaws is located remote from the pillar and thrust transmitting means (54, 56, 62, 66) extends between the drive and one or both of the jaws, to effect relative movement between it and the other. The drive transmitting means may comprise a rigid thrust transmitting member such as a rod or lever, or a flexible sheathed cable, a sheathed rod or an exposed rod, a chain or a set of levers operatively connected one to the other, or any combination thereof.

25 Claims, 3 Drawing Sheets

WORK HOLDING APPARATUS

FIELD OF INVENTION

This invention concerns apparatus for holding workpieces typically but not exclusively to permit one workpiece to be joined to another as by welding or riveting. The invention is not limited to joining techniques such as mentioned but is equally applicable to bonding by adhesive or joining by screwing or hemming.

BACKGROUND TO THE INVENTION

Where two workpiece parts are to be joined together by the above techniques it is usually necessary to overlay one workpiece over the other and to temporarily secure the two workpieces together to allow the joining technique to be performed. This is most simply performed by gripping the two workpiece parts between pairs of jaws. The latter can be urged together so as to grip the workpiece parts using a cam drive and mechanical linkage, typically with an overcentre action so that the clamping action has little tendency to reverse until a positive force is applied to release the overcentre action. However in automated assembly, remotely controllable power operated jaws are required and hitherto it has been commonplace to mount a power unit such as a motor, or piston and cylinder drive means, close to or forming part of the support structure for the jaws and to convey power such as electricity or compressed air or hydraulic fluid to the power unit as appropriate, from a remote source. Appropriate switches or valves control the flow of energy to operate the power unit.

The latter may operate positively so that drive is transmitted to clamp and unclamp the jaws, but single acting drive units may be used with a spring return. Thus for example the power unit may be operated so as to close the jaws against a spring which normally holds them open.

Pneumatic cylinders which are the most popular form of power unit for such devices, but these tend to be bulky and the combination of upright support, power unit, and laterally extending jaws becomes a significant entity which can interfere with access to the workpiece parts by joining tools such as welding guns, riveting guns and the like.

It is therefore a first object of the present invention to reduce the size of a workpiece support as aforesaid so as to increase the access to workpieces clamped between the jaws.

It is another object of the invention to provide a tool plate on which a number of such workpiece holders are mounted together with a tool plate support onto which the tool plate assembly can be mounted and from which the tool plate assembly can be demounted, readily and easily.

SUMMARY OF THE INVENTION

According to the present invention, a workpiece clamping means comprises an upstanding support pillar, two relatively movable workpiece engaging jaws extending from and carried by the support, relative movement between the jaws permitting workpiece parts to be gripped therebetween and thrust drive means remote from the support, with thrust transmitting means between the drive means and one of the jaws to effect relative movement between it and the other.

The thrust transmitting means may act on both jaws so that both are driven into engagement, but more conveniently only one of the jaws is movable by the thrust transmitting means and the other jaw is held stationary.

The drive transmitting means may comprise rigid thrust transmitting members such as rods or a flexible sheathed cable or a combination of such devices.

In a preferred embodiment of the invention workpiece clamping means comprises an upstanding support, a first workpiece engaging jaw extending from and fixed relative to the support, a second workpiece clamping jaw pivotally mounted relative to the support and therefore also the first jaw, whereby relative movement between the jaws can clamp workpiece parts therebetween, and thrust drive means remote from the support with thrust transmitting means between the drive means and the movable jaw to effect relative movement between it and the fixed jaw.

The drive means typically comprises an air cylinder.

The thrust transmitting means may comprise a sheathed cable, a sheathed rod or an exposed rod, a chain or a set of levers operatively connected one to the other, or any combination thereof, to transmit thrust from one end of the set to the other.

In a preferred arrangement, the thrust drive (such as an air cylinder) is located approximately in alignment with the support and below a rigid platform from which the support extends upwardly and a thrust rod extends through an aperture in the platform proximate to the support for conveying thrust from the drive to the moveable jaw.

In another arrangement the support may comprise a hollow tubular or box section member and one or more thrust members extend through the hollow section thereof.

Where the support is carried by a rigid platform (or tool plate as it is more commonly referred to), an aperture aligned with the hollow section of the support allows a thrust member to extend therethrough.

Preferably the thrust drive power unit is double acting so that positive thrust is exerted so as to both close and open the jaws.

Alternatively a single acting thrust drive power unit may be employed and spring means is located acting between the movable jaw and the fixed jaw, (or between the movable jaw and the support, or between a thrust member acting on the movable jaw and support, or a rigid platform on which the support is mounted, or between a thrust member and a stationary fixture), the spring means acting in a direction so as to oppose the movement produced by the single acting power unit.

In order to transmit thrust in both directions, all connection between thrust transmitting means, thrust drive power units, movable levers and the jaw are pinned, to permit relative arcuate movement if required, but in any case to transmit force in both directions between the different parts.

According to a particularly preferred aspect of the invention, a number of such supports each having an associated pair of jaws, may be mounted on a single rigid platform or tool plate and positioned thereon so as to be capable of receiving workpiece parts such as body panels for a motor vehicle, which are to be joined together by any of the aforementioned techniques, and a plurality of thrust drive power units are mounted below the platform, the positioning and spacing of the power units below the platform corresponding to the position and spacing of the supports on the platform, and thrust transmitting means extend between the movable jaws of the support and the corresponding thrust drive power units located below the supports through apertures in the platform.

The thrust drive power units may be mounted in a separate lower platform spaced from the upper platform and rigidly secured thereto.

The thrust transmitting means is preferably formed in two parts, a first part which extends through the platform from the movable jaw thereabove, and a second part which extends from the thrust drive power unit in an upward direction.

A quick release coupling is preferably carried thereon for joining to the thrust transmitting member where it extends below the upper platform to the thrust drive means or a member extending therefrom.

Preferably support means is provided associated with the lower platform on which the upper platform rests, so that the protruding thrust transmission member(s) occupy the correct height relative to the quick release coupling(s) when the upper platform is in position.

Preferably the support means includes locating means for laterally positioning the upper platform relative to the lower platform so that the thrust transmission means and quick release couplings are correctly aligned.

Typically the thrust drive power units are air cylinders and are double acting cylinders for pushing and pulling the thrust transmitting means.

Preferably a supply of compressed air together with flow control valves is provided for supplying air under pressure to selected ones of the air cylinders so as to operate same and lift or lower the jaws associated therewith as required.

Typically the valve means are electrically controlled and programmable computer means is provided for generating appropriate electrical signals for controlling the supply of current to the electrically controlled valves for supplying air under pressure to the appropriate cylinders.

Where double acting cylinders are employed, two air lines are provided to each cylinder and the valve means associated therewith automatically provides for a return path for air from that end of the cylinder which is being evacuated as air pressure is supplied to the other end.

In an alternative arrangement a plurality of supports as hereinbefore defined, are mounted on and extend from a single platform on which are also mounted a corresponding plurality of drive means (typically pneumatic cylinders), and rod or cable thrust transmitting means extend between each moveable jaw and one of the thrust drive means (eg the piston of one of a plurality of our cylinders), so that the whole unit can be moved from one position to another, for example by means of a conveyor, in one plane.

The unit can therefore be moved without lifting from one workstation to the next.

Such an arrangement removes the need for relative vertical movement between the platform and thrust transmitting means at each workstation, such as is otherwise required, but means that pneumatic connections and control connections must be made and re-made at each workstation position.

The invention will now be described by way of example, with reference to the accompanying drawings, in which FIG. 1 is an elevation of one embodiment of the invention;

Figure 1:
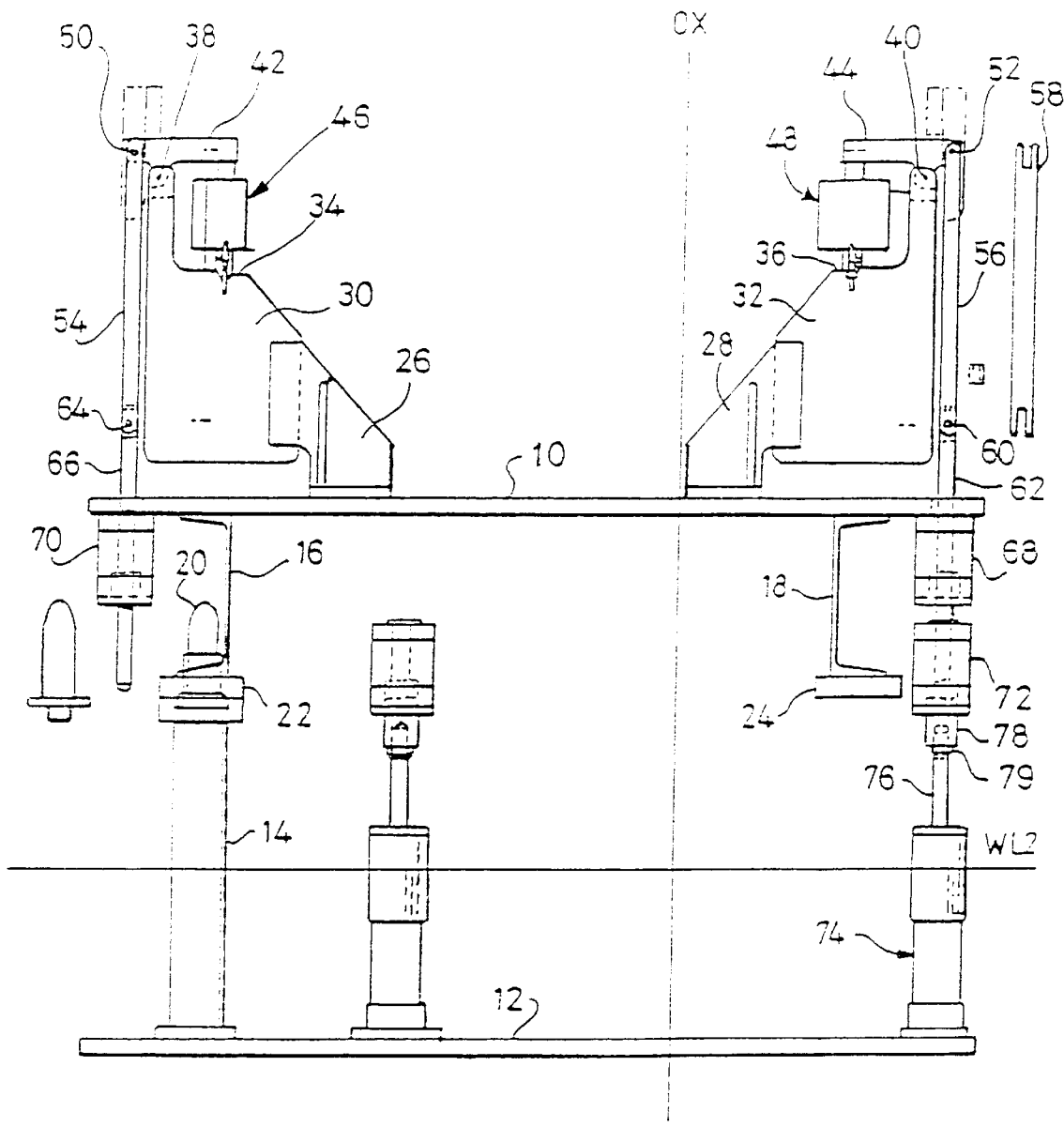

In FIG. 1 drawing an upper platform denoted 10 is shown supported above a lower platform 12 by means of pylons 14 extending from the lower platform 12 and pylon engaging shoes such as 16 which extend below the lower platform 10. A similar shoe is shown at 18 and an appropriate number of pylons and shoes are provided as appropriate depending on the size and weight of the assembly.

At the upper end of each pylon there is a reduced size nose such as 20 which serves to receive and guide into position an aperture in the base of the shoe 16 denoted by 22. A similar base is shown at 24 in relation to shoe 18.

Once each shoe is firmly positioned at the top of a pylon such as 14, it is locked in position both laterally and vertically by the engagement between the upper end of the pylon and the lower end of the shoe.

On the upper platform 10 there are located support brackets such as 26 and 28 which carry support plates 30 and 32 respectively, the upper end of each of which is shaped so as to provide a fixed jaw 34 and 36 respectively and a pivot mounting at 38 and 40 respectively for a pivoting arm 42 and 44 respectively which cooperate with the fixed jaws 34 and 36 to clamp a workpiece assembly such as denoted by 46 and 48 respectively. By virtue of their thin flat form, the support plates 30, 32 allow good side access to workpiece parts gripped between the jaws 34, 42 and 36, 44.

The arms 42 an 44 extend rearwardly of the upstanding plates 30 and 32 respectively to provide pivot attachment points 50 and 52 respectively for the upper ends of a rigid thrust rods 54 and 56 respectively. The rod 56 is also shown as a scrap detail at 58 where the thrust rod has been rotated through a right angle to illustrate its bifurcated ends which allow it to be pinned at the upper end to the pivot point 52 and at its lower end by a pin 60 for attachment to a second thrust rod 62. In the case of thrust rod 54, pin 64 joins it to another thrust rod 66. The rods 62 and 66 extend through sleeved bearing units 68 and 70 respectively secured on the underside of the platform 10. The rods 62, 66 are adapted at their lower ends to protrude into and be received in and engaged by a similar sleeved bearing unit such as shown at 72 in connection with the right hand assembly in the drawing.

The two units 68 and 72 are similar devices but are utilised and operated independently. Each includes a clamping ring for tightening and clamping on a thrust member such as 62 which extends therethrough and each is pneumatically operated to lock onto or release the rod as required. Suitable devices are Fail Safe clamping units such as are manufactured and sold by Ringspann GmbH of Bad Homburg, Germany. Such devices are normally mounted at the end of a pneumatic cylinder and can be used to lock the piston rod relative to the cylinder. In the present case the upper unit 68 serves to clamp the rod 62 so as to hold the rod fixed relative to the platform 10, so that the jaw 44 associated therewith is either held in an open or closed position. The unit 72 is used to clamp onto the protruding end of the rod 62 so that the unit 72 can drive the rod 62 in an upward and downward manner after the unit 68 has been released.

To this end a double acting air cylinder 74 is mounted on the platform 12 in alignment with the rod 62 and the piston rod 76 extending therefrom is adapted by means of a connecting plate 78 to be attached to the lower end of the unit 72 as by bolts, or by screwing, so that the unit 72 is an integral part of the piston rod 76. By virtue of the alignment, rod 62 will enter the upper end of the unit 72 when the platform 10 is lowered into position and after releasing unit 68 and engaging unit 72 movement of the piston rod 76 will be transmitted to the rod 62 and therefore the rod 56, either to pivot the arm 44 up or down to open or close the jaws as required.

A plurality of air lines (not shown) connect the air cylinder such as 74 to a manifold (not shown), and remote controlled valves (not shown), which serve to supply air under pressure to the cylinders as required. Although also not shown, a programmable computer controlled system is employed to control the opening and closing of the valves.

A similar pair of units such as 68 and 72 is provided for each tooling assembly located on the upper platform 10, and since air needs to be supplied to the upper clamping units such as 68 and 70, a quick release manifold coupling is preferably provided to allow quick coupling and decoupling of the air supply to the units on the removable upper platform 10.

A tooling plate such as 10 serves two purposes. On the one hand it serves to support workpiece clamps which can then be opened and closed to receive workpieces on a regular basis for joining as by welding or riveting etc. Each time workpieces are to be located, all of the clamping jaws are opened to receive the workpieces and then closed to clamp the workpieces in position. When no workpieces are in place, the clamping Jaws are all open and in that situation, if desired, the tool plate platform 10 can be completely removed for servicing or checking or re-setting the tooling.

The tool plate can also serve as a jig and workpiece parts clamped thereon can be joined in one station and then moved whilst still in position on the jig to one or more other work stations at which other manufacturing, joining or processing operations can be performed. Only after all of a series of operations have been performed are the clamps opened and the fabricated workpieces removed. The now empty tool plate can be returned to the beginning of the sequence for fresh workpieces to be loaded thereon and the process can be repeated.

Here the tooling plate 10 needs to be capable of being detached from the first platform 12 and moved to and positioned on the next platform similar to platform 12. In this event it is necessary for the tooling on the tool plate to be held in the clamped position between one workstation and the next, so that the workpieces thereon are held firmly in position.

In each case the clamping units 68, 70 etc are clamped around the protruding thrust rods, but whilst in the first example (in which the clamps are left open when the tool plate is removed from the first platform 12), in the second case the tooling clamp jaws must be held in the closed position. This is achieved by clamping the units 68 and 70 on their respective thrust members, whilst the clap jaws are closed.

The assembly as described is of particular use in the fabrication of motor vehicle body panel assemblies.

Although described as a plate, the item 78 may more conveniently comprise a cylindrical sleeve of material, the lower end of which is drilled and tapped to receive the threaded end of the rod 76. A locking nut 79 allows the sleeve to be secured at any of a range of positions determined by the amount by which the rod 76 has been screwed into or out of the sleeve 78.

The sleeve 78 is secured to or forms an integral part of the lower end of unit 72, previously described.

In the embodiment shown in the drawing, the cylinder 74 also includes integrally therewith a similar clamping device similar to 72 and 68, so that the piston rod 76 can be clamped in any position, irrespective of whether fluid pressure is maintained in the cylinder.

The arrangement allows the pistons and cylinders 74 to be locked, when required; the unit 72 to be clamped and the lower end of the rod 62 and unit 68 to clamp the rod 62 relative to the platform 10 for transport between working stations. Pneumatic lines to the cylinders and clamping units 68 and 72 (and the unit integrated with the cylinder 74 and not identified separately) are not shown.

Figure 2:
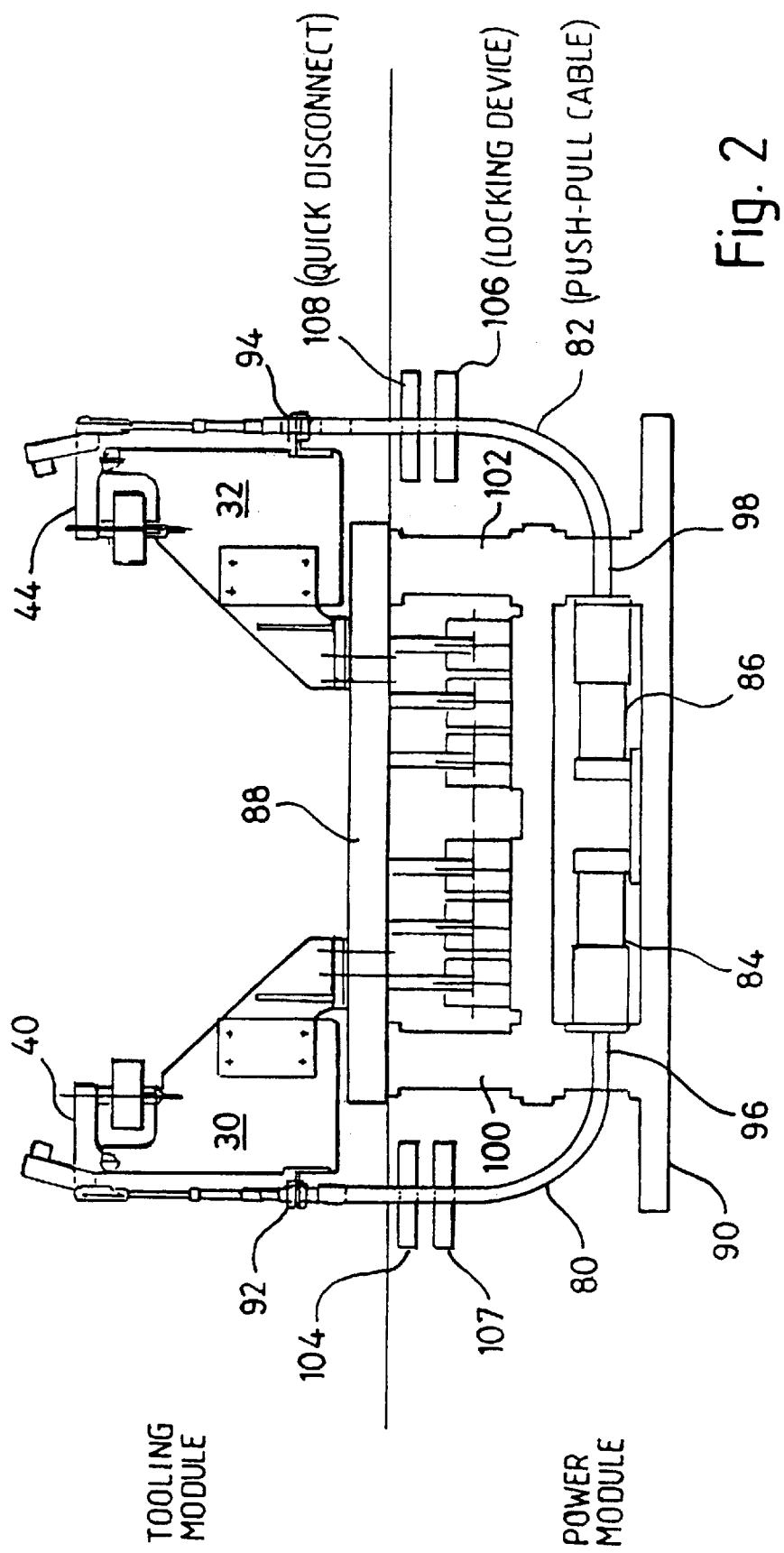
FIG. 2 is an elevation of a second embodiment of the invention.

In FIG. 2 the rods 62 are replaced by sheathed cables 80,82 and the cylinders 84,86 are mounted horizontally to reduce the height of platform 88 over lower platform 90. The upper end of each cable is adapted to be secured to the outer end of each pivoting jaw 42, 44 by a pin joint and the upper sheath ends 92, 94 are secured to the plates 30, 32. At its lower end each cable is secured to a piston (not shown) in each of cylinders 84, 86 typically by means of a quick release clamp (such as described with reference to 72 in FIG. 1) or via a rigid sleeve drilled and tapped at the end to receive the cable and adapted at its other end to be fitted to the piston in the cylinder (84, 86), or into the clamp as aforesaid. Locking nuts are preferably provided where necessary, to lock the screw threaded engagement(s) where set. By screwing the cable and/or rod 76 into or out of the end(s) of a sleeve, so the overall length of the cable can be shortened or lengthened.

The lower end 96, 98 of each sheath 80, 82 is anchored to the platform 90 or rigid standoffs 100, 102 respectively.

The same principle applies however and wherever the cylinders 84, 86 are located relative to the plate 88.

Where cables are merely required to facilitate horizontal or displaced mounting of cylinders 84, 86 units such as 68 and 72 (see FIG. 1) mounted on rod 62 may be left in place, and the upper cable end is simply adapted to be fitted into the lower end of the unit 72. This is shown diagrammatically at 102, 104 and 106, 108 in FIG. 2. Here 102, 106 are clamping devices and 104, 108 allow for quick release.

Figure 3:
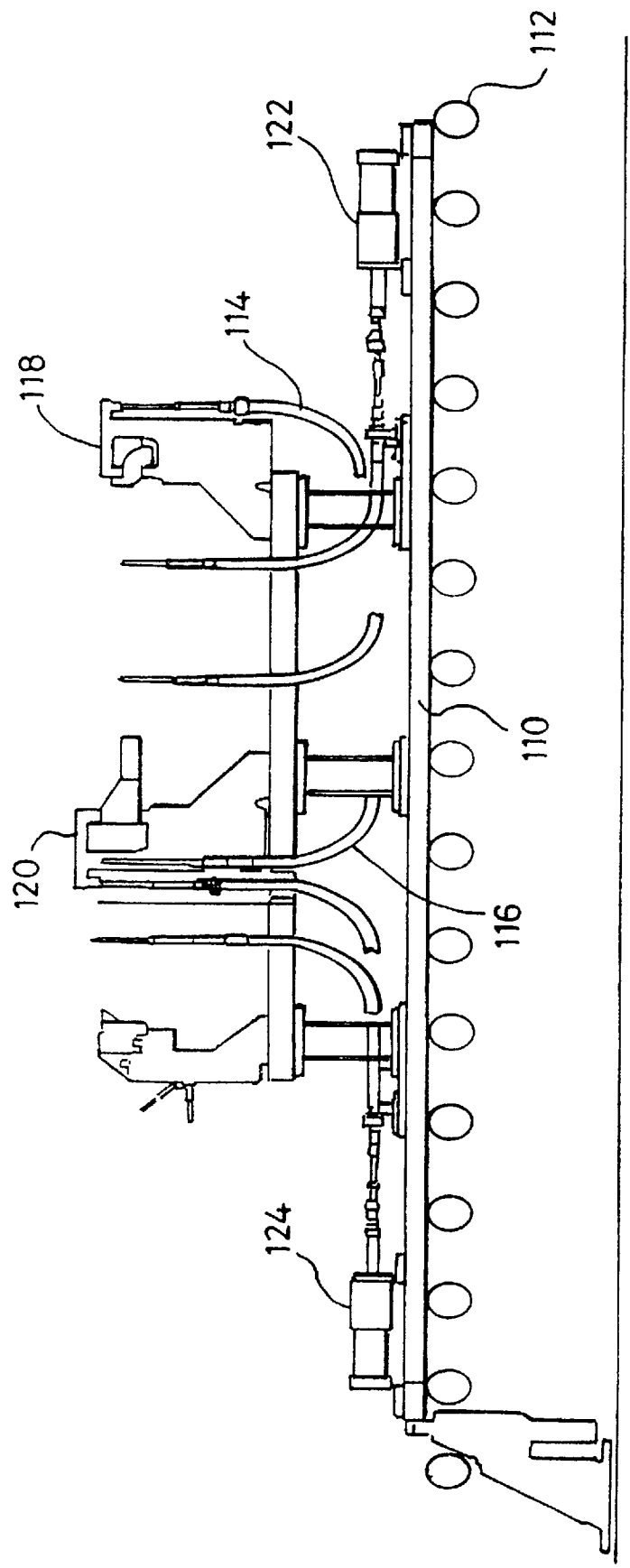
FIG. 3 is an elevation of a third embodiment of the invention.

FIG. 3 shows a further modification in which all the support and cylinders are mounted on the upper face of a single support plate 110 which having an unobstructed underside can traverse a conveyor 112 to move horizontally from one workstation to the next as required, carrying workpieces thereon for different fabrication steps to be made at each workstation. Cables such as 114 and 116 connect jaws such as 118, 120 to cylinders such as 122, 124.

What is claimed is:

1. A workpiece clamping means comprising an upstanding support, two relatively moveable workpiece engaging jaws extending from and carried by the support, relative movement between the jaws permitting workpiece parts to be gripped therebetween, and thrust drive means remotely positioned below the support with thrust transmitting means between the drive means and one of the jaws to effect relative movement between it and the other jaw, wherein at least the upstanding support is mounted on a platform which is detachable so that the whole unit can be moved from one position to another, either with the jaws open or the jaws closed gripping on a workpiece part.

2. A clamping means as claimed in claim 1, wherein the drive means comprises an air cylinder.

3. A clamping means as claimed in claim 1, wherein the thrust transmitting means is selected from the group comprising a sheathed cable, a sheathed rod, an exposed rod, a chain, and a set of levers operatively connected one to the other.

4. A clamping means as claimed in claim 1, wherein the thrust drive is located approximately in alignment with the support and below a rigid platform from which the support extends and a thrust rod extends upwardly through an aperture in the platform proximate to the support for conveying thrust from the drive to the moveable jaw.

5. A clamping means as claimed in claim 1, wherein the support is carried by a rigid platform and an aperture in the plate is aligned with the hollow section of the support to allow a thrust member to extend therethrough.

6. A clamping means as claimed in claim 1, wherein the thrust means is double acting so that positive thrust is exerted to both close and open the jaws.

7. A clamping means as claimed in claim 1, wherein single acting thrust means is employed and spring means is provided acting between the jaws in a direction so as to oppose the movement produced by the single acting thrust means.

8. A clamping means as claimed in claim 1 wherein single acting thrust means is employed and spring means is provided acting between one of the jaws and the support.

9. A clamping means as claimed in claim 1 wherein single acting thrust means is employed and spring means is provided acting between a thrust member acting on one of the jaws and the support.

10. A clamping means as claimed in claim 1, wherein single acting thrust means is employed and spring means is provided acting between a thrust member acting on one of the jaws and a rigid platform on which the support is mounted.

11. A clamping means as claimed in claim 1, wherein single acting thrust means is employed and spring means is provided acting between a thrust member acting on one of the jaws and a stationary fixture.

12. A clamping means as claimed in claim 1, wherein connections between thrust transmitting means, movable levers and a jaw are pinned; to permit relative arcuate movement if required, and to transmit force.

13. A clamping means as claimed in claim 1, which comprises a number of supports each having an associated pair of jaws, mounted on a single rigid platform and positioned thereon so as to be capable of receiving workpiece parts such as body panels for a motor vehicle, which are to be joined together, and wherein a plurality of power units are mounted below the platform the positioning and spacing of the thrust drive means below the platform corresponding to the position and spacing of the supports on the platform, and thrust transmitting means extend between the movable jaws of the support and the corresponding thrust drive means located below the supports, through apertures in the platform.

14. A clamping means as claimed in claim 13, wherein the thrust drive means are mounted on a second platform below the first and are rigidly secured thereto.

15. A clamping means as claimed in claim 13, wherein the thrust transmitting means is formed in two parts, a first part which extends through the platform from the movable jaw thereabove, and a second part which extends from the thrust drive means in an upward direction.

16. A clamping means as claimed in claim 15, wherein a quick release coupling is provided for joining a thrust-transmitting member to one of a thrust drive means and a member extending therefrom.

17. A clamping means as claimed in claim 14, 15 or 16 wherein support means is provided, associated with and extending upwardly from the lower platform on which the upper platform rests and to which it is secured, so that the protruding thrust transmission member(s) occupy the correct height relative to the quick release coupling(s) when the upper platform is positioned thereon.

18. A clamping means as claimed in claim 17, wherein the support means includes locating means for laterally positioning the upper platform relative to the lower platform so that the thrust transmission means and quick release couplings are correctly aligned.

19. A clamping means as claimed in claim 13, wherein the thrust drive units are air cylinders and are double acting cylinders for pushing and pulling the thrust transmitting means.

20. A clamping means as claimed in claim 2, in combination with a supply of compressed air together with flow control valves for supplying air under pressure to selected ones of the air cylinders so as to operate same and lift or lower the jaws associated therewith as required.

21. A clamping means as claimed in claim 2, wherein the valve means are electrically controlled and programmable computer means is provided for generating appropriate electrical signals for controlling the supply of current to the electrically controlled valves for supplying air under pressure to the appropriate cylinders.

22. A clamping means as claimed in claim 2, wherein double acting cylinders are employed, two air lines are provided to each cylinder, and the valve means associated therewith automatically provide for a return path for air from the end of the cylinder which is being evacuated as air pressure is supplied to the other end.

23. A clamping means comprising a plurality of supports as claimed in claim 1, mounted on and extending from a single platform on which are also mounted a corresponding plurality of drive means (typically pneumatic cylinders), and thrust transmitting means extend between each moveable jaw and one of the thrust drive means, so that the whole unit can be moved from one position to another in one plane.

24. A clamping means as claimed in either of claims 1 or 2, wherein the thrust drive means axis is not aligned with the direction of movement of the thrust transmitting means, and a flexible sheathed cable serves to transmit thrust to the thrust transmitting means or direct to the movable jaw or jaws.

25. A clamping means as claimed in claim 1, wherein one of the jaws is fixed to the support and the other is pivotable relative to the first jaw.

\* \* \* \* \*